US009648084B2

United States Patent
Bihani et al.

(10) Patent No.: US 9,648,084 B2
(45) Date of Patent: May 9, 2017

(54) SYSTEM AND METHOD FOR PROVIDING AN IN-MEMORY DATA GRID APPLICATION CONTAINER

(71) Applicant: Oracle International Corporation, Redwood Shores, CA (US)

(72) Inventors: Ballav Bihani, Fremont, CA (US); David Guy, Boston, MA (US); Christer Fahlgren, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 611 days.

(21) Appl. No.: 13/758,693

(22) Filed: Feb. 4, 2013

(65) Prior Publication Data
US 2013/0239004 A1 Sep. 12, 2013

Related U.S. Application Data

(60) Provisional application No. 61/608,515, filed on Mar. 8, 2012.

(51) Int. Cl.
*G06F 15/177* (2006.01)
*G06F 15/173* (2006.01)
*G06F 9/46* (2006.01)
*H04L 29/08* (2006.01)
*H04L 29/06* (2006.01)
*G06F 9/50* (2006.01)

(52) U.S. Cl.
CPC ............. *H04L 67/10* (2013.01); *G06F 9/505* (2013.01); *H04L 29/06* (2013.01)

(58) Field of Classification Search
CPC ............... H04L 29/08144; H04L 29/06; H04L 29/08072; H04L 29/08171; H04L 12/5695; H04L 29/08981; H04L 41/082; G06F 8/65; G06F 9/505; G06F 9/5083; G06F 9/5088
USPC .................................................. 709/226, 221
See application file for complete search history.

(56) References Cited

U.S. PATENT DOCUMENTS 7,721,277 B1 * 5/2010 Thyagarajan ....... G06F 9/44536
717/162
9,286,083 B2 * 3/2016 Winter .................... G06F 9/445
(Continued)

OTHER PUBLICATIONS

Oracle Enterprise Manager Concepts, Mar. 2009, 10g Release 5 (10.2.0.5), pp. 1-266.*
(Continued)

*Primary Examiner* — Mahran Abu Roumi
(74) *Attorney, Agent, or Firm* — Tucker Ellis LLP

(57) ABSTRACT

A system and method for providing an in-memory data grid application container, for use with an application server, is described herein. In accordance with an embodiment, an application server, such as WebLogic Server (WLS), can be used to host data grid applications, such as Coherence applications (in which case the application container can be referred to as a Coherence container), and deliver the same benefits that regular Java Enterprise Edition (EE) applications derive from being hosted in a WLS environment. A model for creating combined Java EE and data grid applications can also be provided, by merging the programming, packaging, and deployment models used for data grid with existing Java EE models.

17 Claims, 6 Drawing Sheets

(56) References Cited

U.S. PATENT DOCUMENTS

| | | | | |
|---|---|---|---|---|
| 2004/0010631 | A1* | 1/2004 | Potter | G06F 9/44563 709/250 |
| 2004/0019684 | A1* | 1/2004 | Potter | G06F 9/466 709/227 |
| 2005/0240545 | A1* | 10/2005 | Schachtely | G05B 23/0227 706/47 |
| 2006/0130034 | A1* | 6/2006 | Beisiegel | G06F 9/445 717/166 |
| 2010/0107172 | A1* | 4/2010 | Calinescu | G06F 9/5061 718/104 |
| 2012/0254383 | A1* | 10/2012 | Cosmadopoulos | G06F 9/5072 709/221 |
| 2013/0239004 | A1* | 9/2013 | Bihani | H04L 67/10 715/734 |
| 2013/0305243 | A1* | 11/2013 | Hiki | G06F 9/5077 718/1 |

OTHER PUBLICATIONS

Oracle Enterprise Manager Adminstration, Dec. 2009, 10g Release 5 (10.2.0.5), pp. 1-350.*
Oracle Enterprise Manager Getting Started Guide for Oracle Coherence, Apr. 2009, 10g Release 5 (10.2.0.5), pp. 1-10.*
Ruzzi, et al., Oracle Coherence Getting Started Guide, Release 3.5, 2008, 176 pages.
Jendrock, et al., The Java EE 5Tutorial for Sun Java System Application Server 9.1, Jun. 2010, 1112 pages.
Ruzzi, et al., Oracle Coherence Getting Started Guide, Release 3.5, 2009, 176 pages.

* cited by examiner

SYSTEM AND METHOD FOR PROVIDING AN IN-MEMORY DATA GRID APPLICATION CONTAINER

CLAIM OF PRIORITY

This application claims the benefit of priority to U.S. Provisional Patent Application titled "SYSTEM AND METHOD FOR PROVIDING A COHERENCE APPLICATION CONTAINER FOR USE WITH AN APPLICATION SERVER"; Application No. 61/608,515; filed Mar. 8, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to in-memory data grid environments, such as Coherence environments, and to application servers, such as WebLogic Server, and is particularly related to a system and method for providing an in-memory data grid application container.

BACKGROUND

Generally described, an in-memory data grid is a software product that, when used in combination with a high-performance computer system, provides replicated and partitioned data management and caching services. An example of such a data grid is Oracle Coherence, which can be used in combination with a plurality of computers to create a data grid comprising a cluster of computers, wherein memory capacity and processing power can be expanded by adding computers to the cluster, and wherein the cluster supports redundancy such that the failure of a cluster member does not impact the operation of the data grid as a whole.

Organizations that utilize in-memory data grids require an effective means by which they can manage their data grid applications and associated environments. Traditionally, such organizations have resorted to using third-party management tools and/or creating their own custom management infrastructure. This is the general area that embodiments of the invention are intended to address.

SUMMARY

In accordance with an embodiment, a system and method for providing an in-memory data grid application container, for use with an application server, is described herein. In accordance with an embodiment, an application server, such as WebLogic Server (WLS), can be used to host data grid applications, such as Coherence applications (in which case the application container can be referred to as a Coherence container), and deliver the same benefits that regular Java Enterprise Edition (EE) applications derive from being hosted in a WLS environment. This also allows the Coherence container to enable multi-tenancy of a data grid application on a single hosting data grid cluster, i.e., to enable each application server instance to support multiple isolated data grid applications. A model for creating combined Java EE (JEE) and data grid applications can also be provided, by merging the programming, packaging, and deployment models used for data grid with existing Java EE models.

DETAILED DESCRIPTION

As described above, in-memory data grids, such as Oracle Coherence, provide replicated and partitioned data management and caching services, and can be used in combination with a plurality of computers to create a data grid cluster of nodes that can be seamlessly expanded with additional memory and processing power as needed, and can transparently fail over if a cluster member fails. Organizations that utilize in-memory data grids require an effective means by which they can manage their data grid applications and associated environments; which has traditionally required use of third-party management tools and/or a custom management infrastructure.

In accordance with an embodiment, a system and method for providing an in-memory data grid application container, for use with an application server, is described herein. In accordance with an embodiment, an application server, such as WebLogic Server (WLS), can be used to host data grid applications, such as Coherence applications (in which case the application container can be referred to as a Coherence container), and deliver the same benefits that regular Java Enterprise Edition (EE) applications derive from being hosted in a WLS environment. This also allows the Coherence container to enable multi-tenancy of a data grid application on a single hosting data grid cluster, i.e., to enable each application server instance to support multiple isolated data grid applications. A model for creating combined Java EE (JEE) and data grid applications can also be provided, by merging the programming, packaging, and deployment models used for data grid with existing Java EE models.

In-Memory Data Grids

Figure 1:
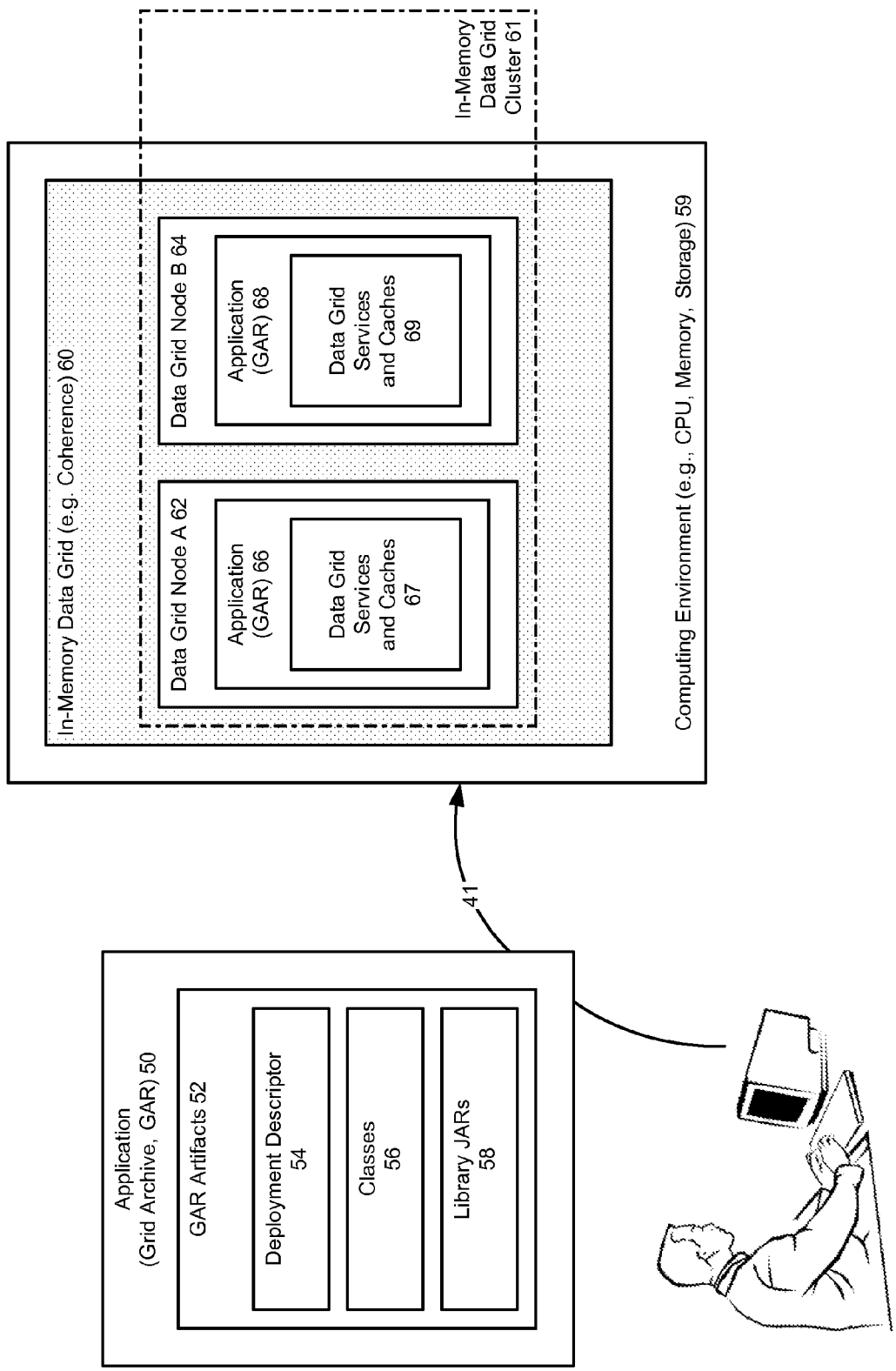
FIG. 1 illustrates system for providing an in-memory data grid (e.g., a Coherence cluster), in accordance with an embodiment.

FIG. 1 illustrates a system for providing an in-memory data grid (e.g., a Coherence cluster), in accordance with an embodiment.

As shown in FIG. 1, in accordance with an embodiment, a user 40 (e.g., an application developer, or an administrator) can generally define 41 a data grid application, in the form of a grid archive (GAR) 50, by defining those artifacts 52 that are required for each node within the data grid to be able to serve a particular cache or invocation request.

For example, in the context of a Coherence environment serving a Coherence application (i.e., a Coherence Grid Archive, or Coherence GAR), such GAR artifacts can include:

A deployment descriptor 54, such as a coherence-application.xml file, which includes a pointer to a cache configuration document that describes the data grid services and caches, and optionally includes a pointer to a Portable Object Format (POF) configuration document that describes data types that are serializable using POF, the name of a class implementing the LifeCycleListener interface, and/or the name of a class implementing the Configurable Cache Factory interface.

A collection of (e.g., Java) classes 56, which are required to serve cache or invocation requests (e.g., implementations of Entry Processors, Filters, Aggregators, or backing-map business logic classes).

A collection of (e.g., Java Archive, JAR) library archives 58, which the collection of classes depends on.

The artifacts described above are provided for purposes of illustration, and are particularly provided to illustrate usage within a Coherence environment and using Coherence GARs. When used with other types of in-memory data grid environment, other types of artifacts can be included within a GAR.

In accordance with an embodiment, a GAR including its artifacts can be provided in the form of a JAR or other data structure that generally mirrors the structure of other types of Java EE artifacts, such as an Enterprise Archive (EAR) or a Web Archive (WAR). The resultant GAR can then be deployed, either as a standalone application or embedded in other standard JEE artifacts such as EARs and WARs, to a computing environment 59 which includes an in-memory data grid environment 60 (e.g., a Coherence environment), to form a data grid cluster 61 (e.g., a Coherence cluster).

In accordance with an embodiment, each node 62, 64 within the data grid cluster that is intended to service requests must share the same grid archives and their associated artifacts 66, 68, in order to provide the appropriate data grid services and caches 67, 69 to invoking clients, regardless of whether the node is, e.g., a data grid cache server, a managed application server, or a custom Java application.

Grid Archive (GAR) Files

In accordance with an embodiment, an example of a grid archive (in this example, a Coherence GAR) is illustrated below, wherein the GAR contains a variety of POF, invocable, and entry processor classes needed by a server to serve a particular cache or invocation request:

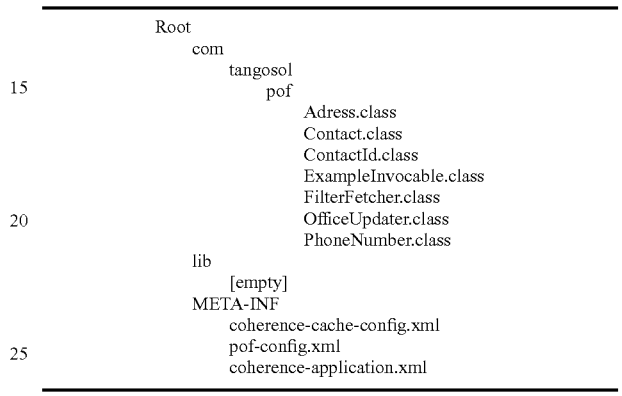

In accordance with an embodiment, the GAR can be structured as an archive file having a ".GAR" extension, within which its classes are provided under a root directory. As illustrated in the above example, a META-INF/coherence-application.xml or similar file can be defined, which contains the application deployment descriptor. A lib directory can also be defined for dependent JARs. For exploded archives, the existence of the META-INF/coherence-application.xml filed can be used to determine that the archive is indeed a GAR.

In accordance with an embodiment, a coherence-application.xml or similar deployment descriptor file can include a root element "coherence-application", and can embed one or more configuration elements, several examples of which shown in Table 1:

TABLE 1

| Element name | Element Description | Example |
|---|---|---|
| cache-configuration-ref | Points to a resource within the archive containing a data grid cache configuration file. | <cache-configuration-ref><br>   coherence-cache-config.xml<br></cache-configuration-ref> |
| pof-configuration-ref | Points to a resource within the archive containing a POF configuration file. | <pof-configuration-ref><br>   pof-config.xml<br></pof-configuration-ref> |
| application-lifecycle-listener | Lists a class implementing the LifecycleListener interface. | <application-lifecycle-listener><br>   <class-name><br>      com.test.MyAppLifeCycleListener<br>   </class-name><br></application-lifecycle-listener> |
| Configurable-cache-factory-config | Lists a class implementing the DefaultConfigurable CacheFactory interface | <configurable-cache-factory-config><br>   <class-name><br>com.test.MyDefaultConfigurableCacheFactory </class-name><br></configurable-cache-factory-config> |

The example configuration elements shown in Table 1 are provided for purposes of illustration. In accordance with other embodiments, other configuration elements can be used.

Grid Archive Terminology

In accordance with an embodiment that utilizes Coherence GARs, the legacy Coherence features of cache servers, proxy servers, client tiers, and server tiers, can be expressed using GAR terminology, as shown in Table 2:

TABLE 2

| Data Grid Term | Legacy Feature | Container Equivalent |
|---|---|---|
| Cache configuration | A cache configuration XML file, typically supplied through a system property to the JVM. | Cache configuration is embedded in a Grid Archive (GAR). Upon deployment of a GAR, the configured data grid (e.g. Coherence) services are made available. |
| Operational configuration | Cluster and "server" parameters specifying, e.g., network configuration, are supplied as an override configuration XML file in the classpath of the JVM. | Operational configuration is derived from application server (e.g., WLS) configuration MBeans. An application server administrative console can be used to modify the MBeans. |
| Coherence application | Every application is custom defined by a customer. Typically, each cluster is operating as one application, where only one cache configuration is in effect at a single point in time. Deployment of EntryProcessors, custom Filters, and value classes is performed by copying files to the machines, modifying the JVM classpath, and restarting the JVMs. By default all services are shared. | Each isolated use of the in-memory data grid (e.g., Coherence) is captured as a Grid Archive (GAR) individually deployable with an individual lifecycle. In the GAR, cache configuration and Java artifacts such as EntryProcessors, custom Filters, key and value classes are stored. By default, different data grid applications (GARs) are isolated, by a service namespace and by ClassLoader. |
| Cache Server (storage enabled) | A JVM launched using the cache-server shell script that stores data on behalf of an application. | An application server (e.g., WLS) or application server cluster that has a GAR deployed with the particular cache configuration for the application and the server's configuration MBean attribute "storage enabled" set to true. |
| Client | A JVM that is part of the cluster, but not storage enabled. Either standalone or part of a Java EE deployment. | An application server (e.g., WLS) that has either a GAR or an EAR with an embedded GAR that has its configuration MBean attribute "storage enabled" set to false. |
| Proxy | A JVM that is part of a cluster running a proxy service as defined in the cache configuration. Coherence Extend is a protocol used to connect clients to Coherence clusters using TCP. Coherence Extend clients are not cluster members themselves; instead they connect to Cluster members that run a proxy service. | A data grid (e.g., Coherence) application represented by a GAR should be available, if desired, to support Coherence Extend connections without clients having to hard code addresses and ports. |
| Cluster | A set of JVMs running the same data grid (e.g., Coherence) cluster service. | A set of application server (e.g., WLS) JVMs running the same data grid (e.g., Coherence) cluster service. The application server JVMs may be part of an application server cluster. There may be more than one application server cluster running the same data grid cluster service. |
| Node | Typically, a single JVM running data grid (e.g., Coherence) services. | A single application server (e.g., WLS) JVM running data grid (e.g., Coherence) |

TABLE 2-continued

| Data Grid Term | Legacy Feature | Container Equivalent |
| --- | --- | --- |
| Extend client | Typically, a single JVM connecting to a proxy using the Coherence Extend protocol configured as a remote cache or invocation scheme. | services. Services can be isolated by application, allowing multiple applications to co-exist in the same node. The cache configuration in a GAR can define remote cache or invocation schemes that allow the application to be an Extend client. |

The Coherence GAR terminology shown in Table 2 is provided for purposes of illustration, and particularly to illustrate usage within a Coherence environment. When used with other types of in-memory data grid environment, other terminology and their meanings can be used.

Grid Archive Deployment to Application Servers

In accordance with an embodiment, an in-memory data grid and its associated grid archive (GAR) applications can be deployed either as one or more standalone Java applications, or as one or more JARs incorporated within a Java application (e.g., an EAR or WAR), together with a tier of cache server virtual machines (e.g., Java Virtual Machine, JVM).

Standalone Grid Archive Application Deployment

In accordance with an embodiment, a GAR can be deployed to one or more application servers as a standalone data grid application. In the context of a Coherence environment this is analogous to a Coherence default cache server, but one that is instead managed by the application server in order to support functionality such as configuration, deployment, lifecycle, and monitoring. This also allows the Coherence container to be used to enable multi-tenancy of a data grid application on a single hosting data grid cluster, i.e., to enable each application server instance to support multiple isolated data grid applications.

In accordance with en embodiment, the application server is adapted to deploy, redeploy and undeploy GARs, by using the application server's application class loader to load, and parse, the deployment descriptor information (e.g., the META-INF/coherence-application.xml resource).

Figure 2:
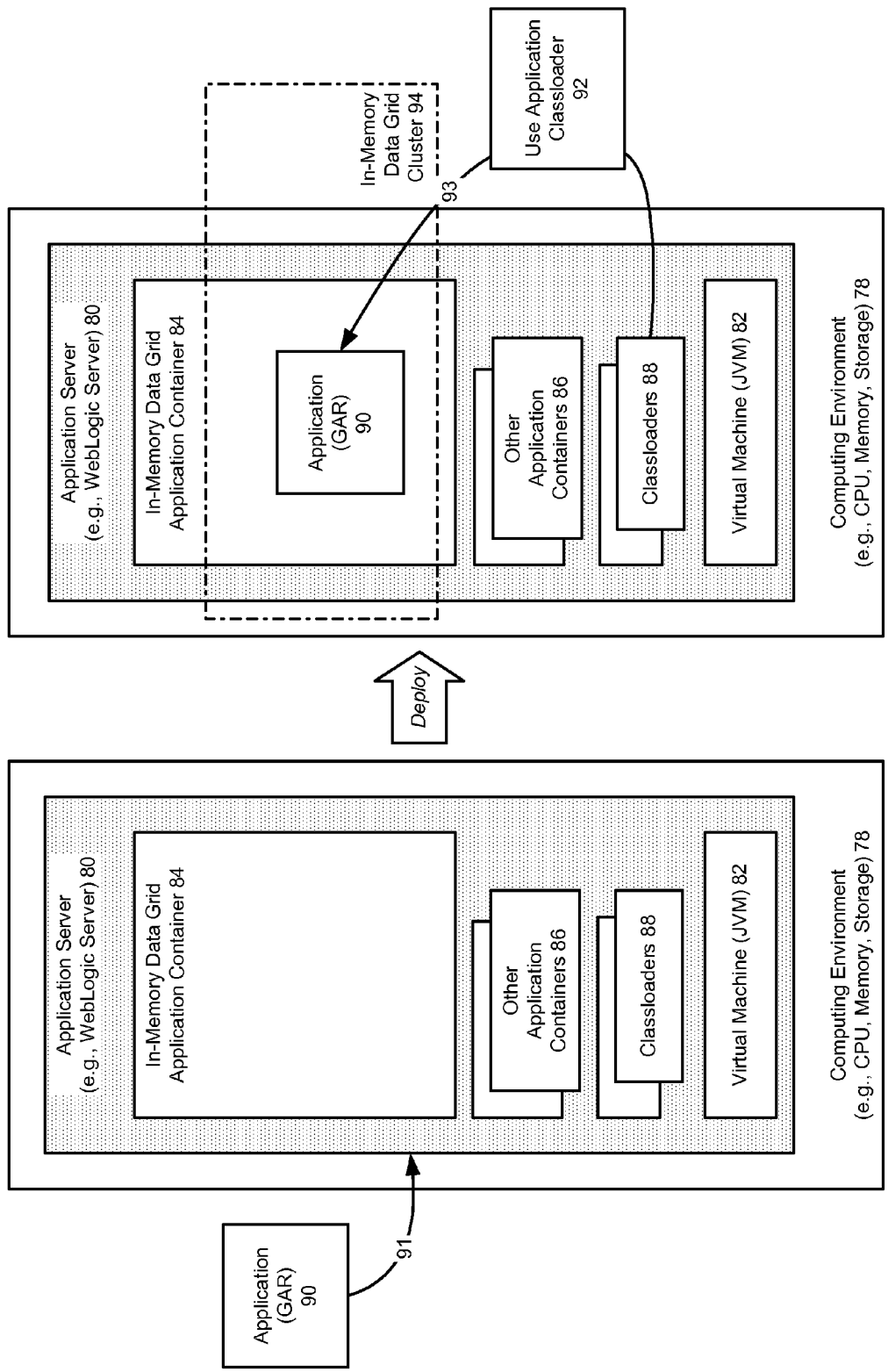
FIG. 2 illustrates deployment of a data grid application to an application server, as a standalone application, in accordance with an embodiment.

FIG. 2 illustrates deployment of a data grid application to an application server, as a standalone application, in accordance with an embodiment.

As shown in FIG. 2, in accordance with an embodiment, each of one or more computing environments 78 includes an application server 80 (e.g., a WLS instance), together with a virtual machine 82 (e.g., a JVM), an in-memory data grid application container 84, and one or more other application containers 86 (e.g., WebApp, Servlet), and classloaders 88 (e.g., Application, EAR), as appropriate.

In accordance with a standalone embodiment, when a GAR 90 is deployed to the application server, its artifacts 92 are automatically loaded 93 by the application server's application classloader into its data grid application container, as a standalone Java application, and is thereafter used by the application server to create or configure a set of application services within the data grid cluster (e.g., a Coherence cluster) 94, according to its configuration.

In accordance with an embodiment, the application server's JVM creates a data grid cluster node (e.g., a Coherence node, or Coherence cluster service) when the application server starts, independent of deployment of any data grid application. If the application server is the first node within the data grid cluster, it can start the, e.g., Coherence cluster service, and become the cluster senior. Such coupling of lifecycles between the in-memory data grid and the application server means that management of the lifecycle of the data grid nodes can be made dependent on the application server lifecycle, i.e., starting and stopping the data grid node can be performed by starting and stopping its associated application server.

Depending on whether the topology is supported, data grid application services (e.g., those cache and invocation services defined by the grid archives) have lifecycles controlled by the lifecycle of the grid archive applications. In accordance with an embodiment, the data grid cluster (e.g., Coherence cluster) formed by the application servers can also be made part of, e.g., a regular Coherence cluster that is based on standalone JVMs running Coherence.

In accordance with an embodiment, the application server's internal usages of an e.g., Coherence data grid, can be isolated by ensuring that its subsystems use Coherence.jar within the system classpath; that the Coherence services are uniquely named through a scoping mechanism in the cache; and that, instead of exposing the Coherence cache configuration, configuration options related to the actual change in behavior that would result from changing the cache configuration are exposed. Additional methods of supporting isolation are described in further detail below.

In accordance with an embodiment, within a particular application server cluster, different tiers can be configured to serve different roles. For example, a first tier can be configured to be stateless and thus not store data; this tier is referred to as being a client; while another tier can be configured to store data and correlate to the traditional Coherence cache server. The tiers can be managed independently within the application server cluster.

In accordance with an embodiment, clients and cache servers can each have a different role; wherein the data grid (e.g., Coherence) is effectively provided as a subsystem of the application server (e.g., WLS), rather than a standalone product. Once the data grid is in the system classpath of the application server, the lifecycle and arity of the data grid nodes is tightly aligned with the lifecycle and arity of the application server. The lifecycle of the server JVM, and thus the data grid cluster and GAR are decoupled in accordance with the typical Java EE model.

Java EE Integrated Grid Archive Application Deployment

In accordance with an embodiment, by including a GAR in a Java EE artifact such as an EAR, the resources in the GAR can be made available to the EAR as result of joining its resources with the EAR's class loader. This enables any application code within the EAR to use those resources residing within the GAR.

In accordance with an embodiment, only one GAR is permitted in an EAR, although in accordance with other embodiments an EAR can include a plurality of GARs. The application server is adapted to deploy, redeploy and undeploy an EAR that contains a GAR, by using a GAR module type defined for the weblogic-application.xml, defining the EAR to contain a resource (e.g., weblogic-application.xml) with an entry for the GAR module, and then using the application server's EAR class loader to load, and parse, the deployment descriptor information (e.g., the META-INF/ coherence-application.xml resource).

Figure 3:
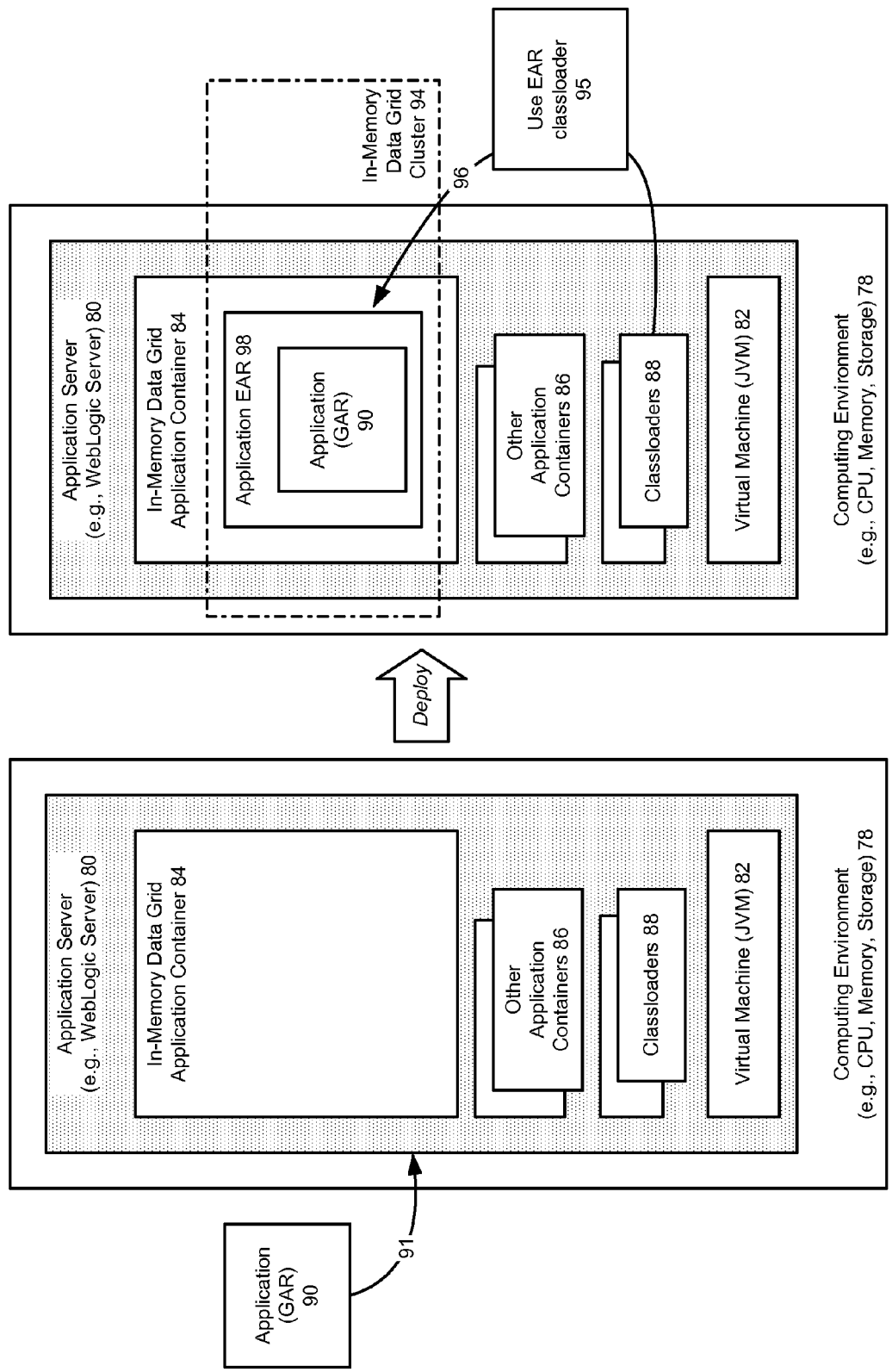
FIG. 3 illustrates deployment of a data grid application to an application server, as a Java application, in accordance with an embodiment.

FIG. 3 illustrates deployment of a data grid application to an application server, as a Java application, in accordance with an embodiment.

As shown in FIG. 3, in accordance with an embodiment, each of one or more computing environments similarly includes an application server, together with a virtual machine, an in-memory data grid application container, and one or more other application containers and classloaders, as appropriate.

In accordance with a Java application embodiment, when a GAR is deployed to an application server within an EAR, its artifacts are automatically loaded by the application server's EAR class loader 95, 96, as part of an Enterprise Archive (EAR) 98, and is thereafter used by the application server to create or configure a data grid cluster (e.g., a Coherence cluster), according to its configuration.

Grid Archive Deployment Topologies

Figure 4:
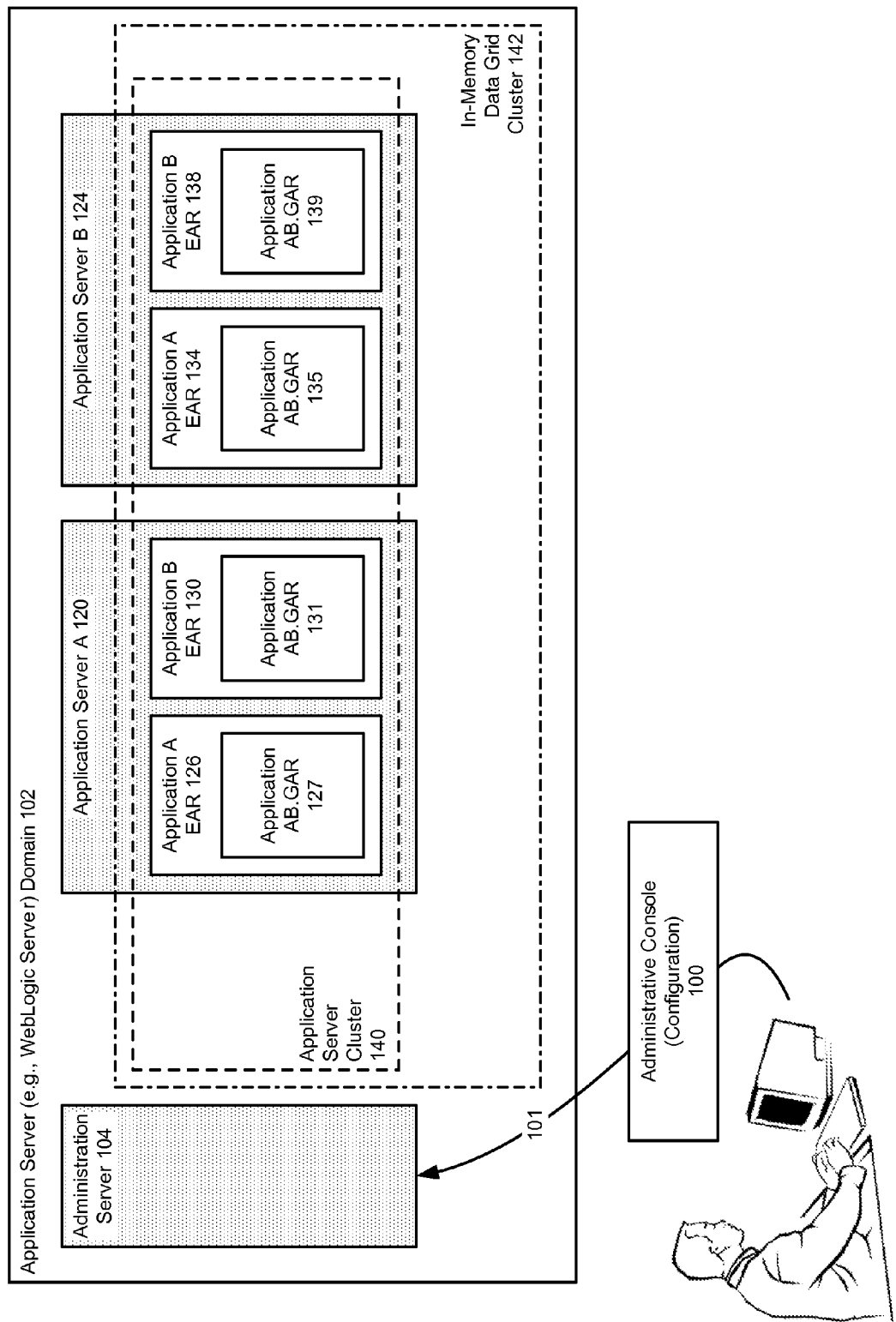
FIG. 4 illustrates an example of a system for providing an in-memory data grid application container for use with an application server, in accordance with an embodiment.
Figure 5:
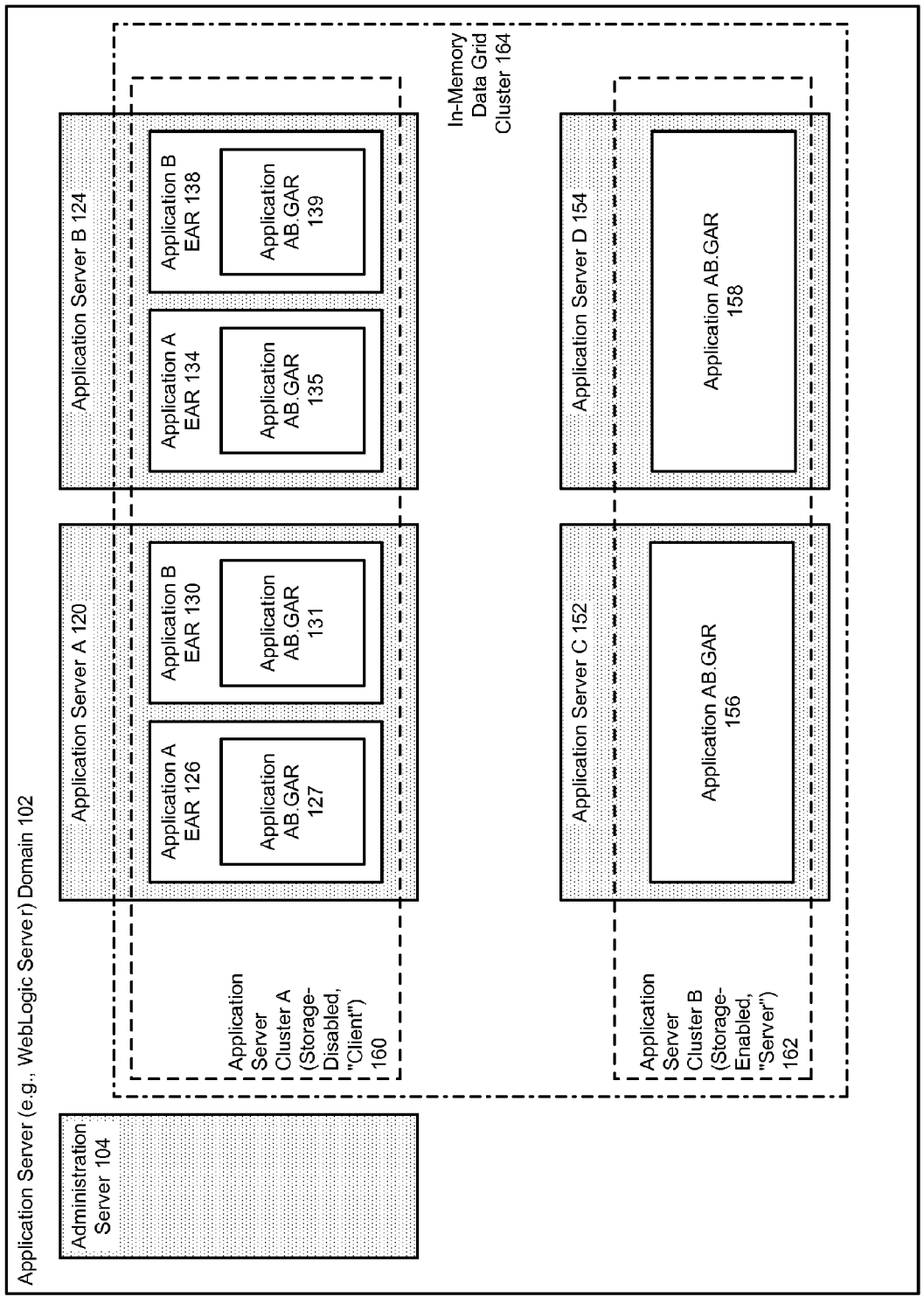
FIG. 5 illustrates an example of a system for providing an in-memory data grid application container for use with an application server, in accordance with an embodiment.

FIGS. 4 and 5 illustrate examples of a system for providing an in-memory data grid application container for use with an application server, in accordance with various embodiments. The example deployment topologies shown in FIGS. 4 and 5 are provided for purposes of illustration. In accordance with other embodiments, other forms of deployment topologies can be used.

As shown in the example of FIG. 4, in accordance with an embodiment, an application developer, administrator or other user can use an administrative console 100 to configure 101, via an administration server 104, an application server domain 102 that includes a plurality of application server instances 120, 124, to create or configure a data grid cluster. In accordance with an embodiment, a typical deployment topology can include:

Deploying an application GAR 127, 131, 135, 139, within EARs 126, 130 134 138, to a plurality of application server instances.

Defining an in-memory data grid (e.g., Coherence) cluster within an application server (e.g., WLS) cluster, using the application server's clustering mechanisms 140 as a grouping mechanism. Optionally, a client tier and a server tier can be defined with the data grid domain, wherein clients are generally configured for not storing data grid or cached data, whereas servers are configured for storing data grid or cached data.

Implementing the GARs, using the application server clustering, within a data grid (e.g., Coherence) cluster 142.

As shown in the example of FIG. 5, in accordance with an embodiment, an application developer, administrator or other user can similarly use the administrative console to configure the application server domain to include, in this example, four application server instances 120, 124, 152, 154, to create or configure a data grid cluster.

In the example shown in FIG. 5, the user can deploy two EAR files which share a single set of data grid (e.g., Coherence) caches as dedicated cache servers. Each of the EARs can contain, in this example, a GAR named "ApplicationAB.GAR". The user can create a target domain by creating two application server clusters (i.e., application server cluster A 160, which is storage-disabled and acting as a client tier, and application server cluster B 162, which is storage-enabled and acting as a server tier); creating a data grid cluster; and associating both of the application server clusters with a data grid cluster 164. The user can then deploy a data grid application by deploying the ApplicationAB.GAR file 156, 158, containing the GAR application, to application server cluster B, and deploying the EAR archives to application server cluster A.

Grid Archive Deployment Process

Figure 6:
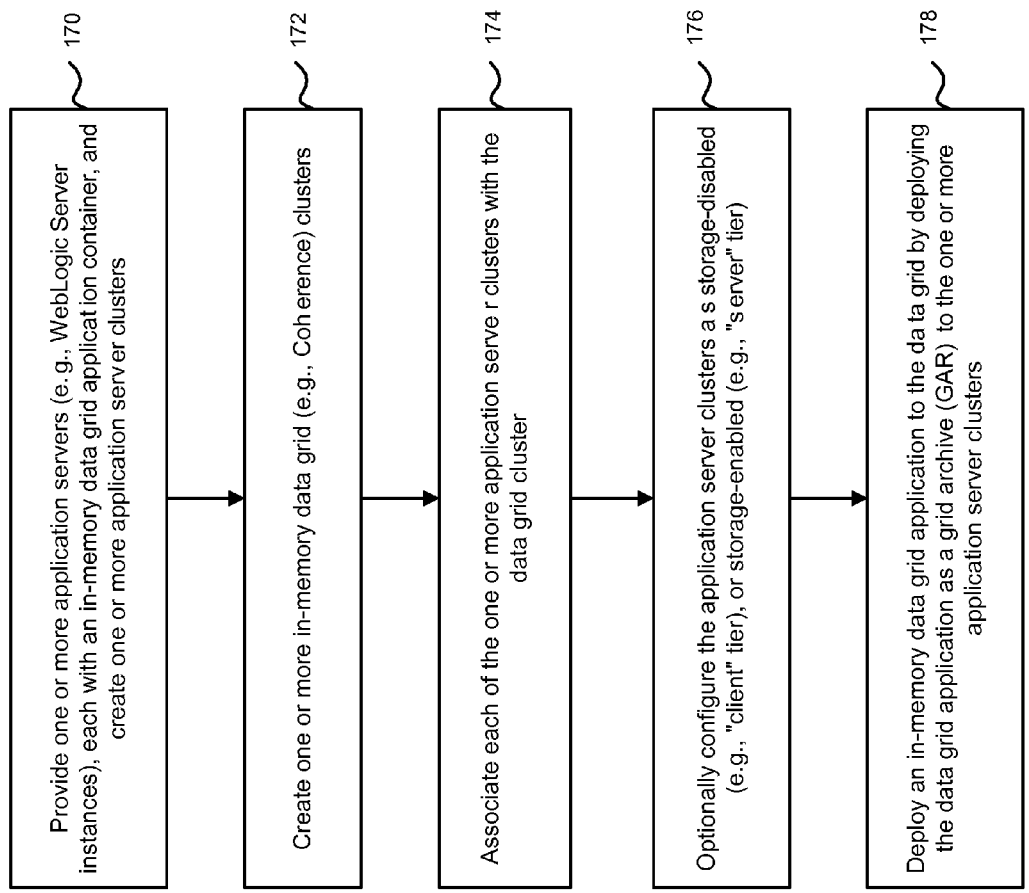
FIG. 6 is a flowchart of a method for providing an in-memory data grid application container for use with an application server, in accordance with an embodiment.

FIG. 6 is a flowchart of a method for providing an in-memory data grid application container for use with an application server, in accordance with an embodiment.

As shown in FIG. 6, in accordance with an embodiment, at step 170, one or more application servers (e.g., WebLogic Server instances) are provided with an in-memory data grid application container, and are used to create one or more application server clusters.

At step 172, a user (e.g., an administrator) can use an application server administrative console or other means to create one or more in-memory data grid (e.g., Coherence) clusters.

At step 174, each of the one or more application server clusters are associated with the data grid cluster.

At step 176, the user can optionally configure the application server clusters as storage-disabled (e.g., a client, or client tier), or storage-enabled (e.g., a server, or server tier).

At step 178, the user can deploy an in-memory data grid application as a GAR to the data grid, by deploying the data grid application to the one or more application server clusters, either as a standalone application or as a Java application.

Usage of GARs within a WAR

In accordance with an embodiment that includes a Coherence environment and uses Coherence GARs, for use in supporting legacy environments, a cache configuration can be placed in WEB-INF/classes/META-INF. If the WAR references active-cache, Coherence services defined in the cache configuration are started. A variety of scenarios can be used to define the semantics for resolving cache configuration with embedded WARs and GARs in an EAR, including:

Cache configuration in GAR: if code in a WAR (or using a WAR class loader) tries to resolve a ConfigurableCacheFactory, the system will traverse the classloader chain to find a potential ConfigurableCacheFactory associated with the parent class loader.

Cache configuration in WAR's WEB-INF/classes/META-INF: if there is a cache configuration in the WARs WEB-INF/classes/META-INF directory, then the system must find or instantiate a ConfigurableCacheFactory for that cache configuration without considering a potential parent Cache configuration in both GAR and WAR: in this case, the system must use the ConfigurableCacheFactory associated with the WAR class loader.

Cache configuration in EAR's APP-INF/classes/META-INF: if no GAR is embedded in the EAR, a ConfigurableCacheFactory associated with the EAR's class loader will be instantiated; if a GAR is embedded, the cache configuration in APP-INF/classes/META-INF is ignored.

Grid Archive Application Isolation

In accordance with an embodiment, isolation generally means two things; isolation of the data grid (e.g., Coherence) services, and isolation of classes by means of class loaders.

In accordance with an embodiment, to provide isolation of the data grid services, GARs with different names are isolated from each other by default, i.e., two differently named GARs deployed to the same application server domain, or to the same application server instances, are isolated from each other, even if the contents of those two GARs are completely identical. Conversely, GARs with the same name will share resources regardless of whether they are deployed as standalone applications or as Java EE integrated applications. A standalone data grid or GAR application can share resources with a Java EE integrated data grid or GAR application.

In accordance with an embodiment, isolation of classes between deployed GARs can be provided by the normal application server class loading mechanisms used for deploying EE modules.

In accordance with an embodiment, isolation of application server internal usage of the data grid can be provided by making sure that subsystems use, e.g., Coherence.jar in the system classpath; that data grid services are uniquely named through the scoping mechanism in the cache config; and that, instead of exposing the Coherence cache configuration, configuration options related to the actual change in behavior that would result from changing the cache configuration are exposed.

Storage Enablement

A feature of Coherence cluster deployments is the ability to designate that only some servers within a Coherence cluster will store data. In accordance with an embodiment, storage enablement can be determined by the <local-storage> element in the cache-config.xml (in which the default value is true, but can be overridden by a system property, e.g., tangosol.coherence.distributed.localstorage).

A related topic is storage enablement for internal usages of Coherence, examples of which include WLS internal use of Coherence for Coherence*Web, and SIP services. In accordance with an embodiment, application server (e.g., WLS) subsystems can use the scoping mechanism of Coherence to generate uniquely named Coherence services that are unique to the subsystem itself.

Management

In accordance with an embodiment, in order to manage data grid (e.g. Coherence) clusters using the application server's (e.g., WLS) administrative console, a subset of attributes guiding the data grid clusters can be exposed as MBeans to the application server's configuration infrastructure. Application server clusters and individual application server instances can also be linked to the data grid cluster, wherein application server cluster membership transitively includes its members, by instructing the data grid to register its MBeans with the local WebLogic runtime MBean server.

Security

In accordance with an embodiment, a security framework (e.g., the Coherence Security Framework) can be used to prevent unauthorized JVMs/nodes from joining the data grid cluster; while access to caches and services within the application server can be protected by the application server's own security framework.

In accordance with an embodiment, the Coherence Security Framework uses an access controller to manage access to clustered resources, such as clustered services and caches, and to prevent malicious nodes from joining a clustered service. In accordance with an embodiment, an access controller implementation that uses public key infrastructure (PKI) can be used to ensure trust between nodes, e.g., by permission checking a "join" when a node joins a clustered service. Once trust is established, there is no additional need for fine-grained access control on cache or service operations, such as gets and puts. In accordance with an embodiment, the container can also provide an additional security mechanism for authorization when application code attempts to obtain Coherence application caches or services, by integrating the container with the application server's (e.g., WebLogic) built-in authorization service. An attempt to obtain a cache or service will be checked by the authorization configured for the WebLogic domain. By default, access to Coherence caches and services is unrestricted, but can be restricted by a WebLogic administrator with the same authorization policies available within WebLogic for any other type of resource.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. In particular, while many of the examples described above illustrate a Coherence data grid environment and a WebLogic application server, in accordance with other embodiments, other types of data grid environments and application servers can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing an in-memory data grid application container for use with an application server, comprising:

a computer that includes a processor, a memory, and at least one application server instance operating therein, wherein each application server instance includes an application container that is configured to interface with an in-memory data grid application, and wherein each application server instance is associated with at least one classloader;

a grid archive file that is contained within an enterprise archive file, and includes artifacts that describe the in-memory data grid application, wherein the artifacts include a configuration of at least one data grid service to be provided by the in-memory data grid application; and an interface that is used to deploy the in-memory data grid application that is described by the grid archive file, to the application container of the at least one application server instance, and to at least one of create or configure an in-memory data grid cluster, utilizing the at least one application server instance having the deployed in-memory data grid application, wherein upon deployment of the grid archive file contained within the enterprise archive file to the at least one application server instance, the at least one application server instance processes the grid archive file so that a classloader that is associated with the at least one application server instance and the enterprise archive file automatically loads the artifacts of the grid archive file into the application container of its associated application server instance, including joining resources of the grid archive file with the classloader associated with the at least one application server instance and the enterprise archive file, and deploys the in-memory data grid application to the at least one application server instance, for use with the in-memory data grid cluster, including enabling application code within the enterprise archive file to use the resources of the grid archive file, as determined by the classloader associated with the at least one application server instance and the enterprise archive file.

2. The system of claim 1, wherein one or more aspects of the data grid cluster, including a data grid lifecycle, are configurable within the at least one application server instance.

3. The system of claim 1, wherein each of the application server instances having the deployed grid archive file can be indicated as one of a client or a server within the data grid cluster.

4. The system of claim 1, wherein one or more of the selected application server instances having the deployed grid archive file can act as one of either a client or a server to another existing data grid environment.

5. The system of claim 1, wherein the at least one application server instance includes the classloader; and wherein upon deployment of the grid archive file, the classloader automatically loads the artifacts of the grid archive file into the application container of the application server as a standalone in-memory data grid application according to the configuration information.

6. The system of claim 5, wherein the in-memory data grid application is an ORACLE Coherence environment, and the application server instance is an ORACLE WebLogic Server.

7. A method of providing an in-memory data grid application container for use with an application server, comprising the steps of:

providing, at a computer that includes a processor and a memory, at least one application server instance operating therein, wherein each application server instance includes an application container that is configured to interface with an in-memory data grid application, and wherein each application server instance is associated with at least one classloader;

providing a grid archive file that is contained within an enterprise archive file, and includes artifacts that describe the in-memory data grid application, wherein the artifacts include a configuration of at least one data grid service to be provided by the in-memory data grid application; and providing an interface that is used to deploy the in-memory data grid application that is described by the grid archive file, to the application container of the at least one application server instance, and to at least one of create or configure an in-memory data grid cluster, utilizing the at least one application server instance having the deployed in-memory data grid application, wherein upon deployment of the grid archive file contained within the enterprise archive file to the at least one application server instance, the at least one application server instance processes the grid archive file so that a classloader that is associated with the at least one application server instance and the enterprise archive file automatically loads the artifacts of the grid archive file into the application container of its associated application server instance, including joining resources of the grid archive file with the classloader associated with the at least one application server instance and the enterprise archive file, and deploys the in-memory data grid application to the at least one application server instance, for use with the in-memory data grid cluster, including enabling application code within the enterprise archive file to use the resources of the grid archive file, as determined by the classloader associated with the at least one application server instance and the enterprise archive file.

8. The method of claim 7, wherein one or more aspects of the data grid cluster, including a data grid lifecycle, are configurable within the at least one application server instance.

9. The method of claim 7, wherein each of the application server instances having the deployed grid archive file can be indicated as one of a client or a server within the data grid cluster.

10. The method of claim 7, wherein one or more selected application server instances having the deployed grid archive file can act as one of either a client or a server to another existing data grid environment.

11. The method of claim 7, wherein the at least one application server instance includes the classloader; and wherein upon deployment of the grid archive file, the classloader automatically loads the artifacts of the grid archive file into the application container of the application server as a standalone in-memory data grid application according to the configuration information.

12. The method of claim 11, wherein the in-memory data grid application is an ORACLE Coherence environment, and the application server instance is an ORACLE WebLogic Server.

13. A non-transitory computer readable storage medium including instructions stored thereon which when read and executed by one or more computers cause the one or more computers to perform the steps comprising:

providing, at a computer that includes a processor and a memory, at least one application server instance operating therein, wherein each application server instance includes an application container that is configured to interface with an in-memory data grid application, and wherein each application server instance is associated with at least one classloader;

providing a grid archive file that is contained within an enterprise archive file, and includes artifacts that describe the in-memory data grid application, wherein the artifacts include a configuration of at least one data grid service to be provided by the in-memory data grid application; and providing an interface that is used to deploy the in-memory data grid application that is described by the grid archive file, to the application container of the at least one application server instance, and to at least one of create or configure an in-memory data grid cluster, utilizing the at least one application server instance having the deployed in-memory data grid application, wherein upon deployment of the grid archive file contained within the enterprise archive file to the at least one application server instance, the at least one application server instance processes the grid archive file so that a classloader that is associated with the at least one application server instance and the enterprise archive file automatically loads the artifacts of the grid archive file into the application container of its associated application server instance, including joining resources of the grid archive file with the classloader associated with the at least one application server instance and the enterprise archive file, and deploys the in-memory data grid application to the at least one application server instance, for use with the in-memory data grid cluster, including enabling application code within the enterprise archive file to use the resources of the grid archive file, as determined by the classloader associated with the at least one application server instance and the enterprise archive file.

14. The non-transitory computer readable storage medium of claim 13, wherein one or more aspects of the data grid cluster, including a data grid lifecycle, are configurable within the at least one application server instance.

15. The non-transitory computer readable storage medium of claim 13, wherein each of the application server instances having the deployed grid archive file can be indicated as one of a client or a server within the data grid cluster.

16. The non-transitory computer readable storage medium of claim 13, wherein one or more selected application server instances having the deployed grid archive file can act as one of either a client or a server to another existing data grid environment.

17. The non-transitory computer readable storage medium of claim 13, wherein the at least one application server instance includes the classloader; and wherein upon deployment of the grid archive file, the classloader automatically loads the artifacts of the grid archive file into the application container of the application server as a standalone in-memory data grid application according to the configuration.

* * * * *

UNITED STATES PATENT AND TRADEMARK OFFICE
CERTIFICATE OF CORRECTION

PATENT NO.       : 9,648,084 B2
APPLICATION NO.  : 13/758693
DATED            : May 9, 2017
INVENTOR(S)      : Bihani et al.

It is certified that error appears in the above-identified patent and that said Letters Patent is hereby corrected as shown below:

On the Title Page

On page 2, Column 1, under Other Publications, Line 1, delete "Adminstration," and insert -- Administration, --, therefor.

In the Drawings

On sheet 6 of 6, in Figure 6, under Reference Numeral 174, Line 1, delete "serve r" and insert -- server --, therefor.

In the Specification

In Column 7, Line 41, delete "en" and insert -- an --, therefor.

In the Claims

In Column 13, Line 40, in Claim 4, after "more" delete "of the".

In Column 13, Line 50, in Claim 5, delete "configuration information." and insert -- configuration. --, therefor.

In Column 14, Line 51, in Claim 11, delete "configuration information." and insert -- configuration. --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*